(12) United States Patent
Grobe et al.

(10) Patent No.: US 10,700,917 B2
(45) Date of Patent: Jun. 30, 2020

(54) LIFE CYCLE NETWORK MANAGEMENT SYSTEM FOR PERFORMING LIFE CYCLE AND MAINTENANCE MANAGEMENT OF DISTRIBUTED NETWORK DEVICES

(71) Applicant: ADVA Optical Networking SE, Meiningen OT Dreissigacker (DE)

(72) Inventors: Klaus Grobe, Planegg (DE); Michael Huthart, Barlow (GB)

(73) Assignee: ADVA OPTICAL NETWORKING SE, Meiningen ot Dreissigacker (DE)

( * ) Notice: Subject to any disclaimer, the term of this patent is extended or adjusted under 35 U.S.C. 154(b) by 49 days.

(21) Appl. No.: 15/947,766

(22) Filed: Apr. 6, 2018

(65) Prior Publication Data

US 2018/0295010 A1 Oct. 11, 2018

(30) Foreign Application Priority Data

Apr. 11, 2017 (EP) .................................... 17165858

(51) Int. Cl.
*H04L 12/24* (2006.01)
*G06Q 10/00* (2012.01)
(Continued)

(52) U.S. Cl.
CPC ......... *H04L 41/0213* (2013.01); *G06Q 10/08* (2013.01); *G06Q 10/20* (2013.01);
(Continued)

(58) Field of Classification Search
CPC ... H04L 41/0213; H04L 41/082; H04L 41/06; H04L 41/048; H04L 41/0816; H04L 67/10; G06Q 10/08; G06Q 10/20
See application file for complete search history.

(56) References Cited

U.S. PATENT DOCUMENTS 7,251,236 B1   7/2007 Cook
9,674,704 B1 * 6/2017 Narasimha .............. H04W 8/18
(Continued)

FOREIGN PATENT DOCUMENTS

CN   103971218 A  *  8/2014
CN   106600162 A  *  4/2017
(Continued)

OTHER PUBLICATIONS

Communication of the extended European search report for European Application No. 17165858.6 (dated Jun. 19, 2017).
(Continued)

*Primary Examiner* — Kostas J Katsikis
(74) *Attorney, Agent, or Firm* — Jenkins, Wilson, Taylor & Hunt, P.A.

(57) ABSTRACT

A life cycle network management system for performing life cycle management of distributed network devices, each network device comprising a communication link to a central network management unit and an attached transponder configured to store life cycle data of the network device updated by said network device, wherein if the communication link between the network device and the central network management unit is at least temporarily unavailable the updated life cycle data of the network device stored in the attached transponder is read by an interrogation unit of the life cycle network management system and processed to provide a life cycle management result.

17 Claims, 4 Drawing Sheets

(51) Int. Cl.
*G06Q 10/08* (2012.01)
*H04L 29/08* (2006.01)

(52) U.S. Cl.
CPC .......... *H04L 41/048* (2013.01); *H04L 41/06* (2013.01); *H04L 41/082* (2013.01); *H04L 41/0816* (2013.01); *H04L 67/10* (2013.01)

(56) References Cited

U.S. PATENT DOCUMENTS

| | | | | |
|---|---|---|---|---|
| 9,918,227 | B2* | 3/2018 | Narasimha | H04W 12/06 |
| 2002/0099587 | A1* | 7/2002 | Kakihana | G06Q 10/06 705/308 |
| 2004/0153539 | A1 | 8/2004 | Lyon et al. | |
| 2005/0137933 | A1* | 6/2005 | Holsen | G06Q 10/08 705/338 |
| 2005/0200478 | A1* | 9/2005 | Koch | G06Q 10/08 340/539.13 |
| 2007/0112574 | A1* | 5/2007 | Greene | G06F 9/5072 340/572.1 |
| 2007/0164109 | A1* | 7/2007 | Ridings | G01R 31/302 235/451 |
| 2007/0293232 | A1* | 12/2007 | Nonaka | H04W 24/00 455/450 |
| 2009/0079544 | A1* | 3/2009 | Noble | H04Q 9/00 340/10.1 |
| 2012/0171995 | A1* | 7/2012 | Krafzik | H04W 4/023 455/411 |
| 2012/0239493 | A1* | 9/2012 | Zughaib | G06Q 10/08 705/14.49 |
| 2013/0124186 | A1* | 5/2013 | Donabedian | G06F 40/40 704/2 |
| 2014/0057558 | A1* | 2/2014 | Cooper | H04W 12/06 455/41.1 |
| 2017/0150352 | A1* | 5/2017 | Narasimha | H04W 8/18 |

FOREIGN PATENT DOCUMENTS

| | | | | |
|---|---|---|---|---|
| EP | | 3388983 A1 * | 10/2018 | ......... H04L 41/0816 |
| WO | WO-2006077636 A1 * | | 7/2006 | ............. G06Q 10/08 |

OTHER PUBLICATIONS

Mitsugi et al., "RF Tag with RF and Baseband Communication Interfaces for Product Lifecycle Management," Auto-ID Labs White Paper, pp. 1-18 (Mar. 2009).
Summons to Attend Oral Proceedings Pursuant to Rule 115(1) EPC for European Patent Application No. 17 165 858.6 (Nov. 14, 2019).

* cited by examiner

_US 10,700,917 B2_

LIFE CYCLE NETWORK MANAGEMENT SYSTEM FOR PERFORMING LIFE CYCLE AND MAINTENANCE MANAGEMENT OF DISTRIBUTED NETWORK DEVICES

PRIORITY CLAIM

This application claims the benefit of European Patent Application No. 17165858.6, filed Apr. 11, 2017; the disclosure of which is incorporated herein by reference in its entirety.

TECHNICAL FIELD

The invention relates to a life cycle network management system for performing life cycle management and/or maintenance management of distributed network devices of a network.

TECHNICAL BACKGROUND

A network such as an optical network can comprise a plurality of different distributed network devices. The network devices can be any kind of network devices such as routers, bridges, Add-drop multiplexers or they may comprise components of devices such as printed circuit boards, insertable cards or modules. For instance, a rack can comprise a number of different network devices formed by modules which can be sampled in the rack. The network can comprise a plurality of different distributed network devices which may be active or inactive. A network device such as a module or a host device might be deactivated for maintenance or repair purposes. Further, a network device might become outdated or must be replaced by another network device. In this case, the network device can be deactivated or switched off and be used for recycling. The network device can comprise components which can be used for recycling such as components consisting of valuable materials including metals. The recycling includes the collection and recovery of products and/or devices as well as the recovery of components and/or parts of the devices and/or the recovery and recycling of materials of products and/or parts of the distributed network devices. Consequently, the management of the repair, reuse and recycling of network devices within a distributed network is complex.

Accordingly, there is a need to provide a management system which allows for reliable and efficient life cycle management of distributed network devices of a network.

SUMMARY OF THE INVENTION

The invention provides according to the first aspect of the present invention a life cycle network management system for performing life cycle management of distributed network devices of a network, each network device comprising a communication link to a central network management unit of the management system and comprising an attached transponder configured to store life cycle data of the network device updated by said network device, wherein if the communication link between the network device and the central network management unit is at least temporarily unavailable the updated life cycle data of the network device stored in the attached transponder can be read by an interrogation unit of the life cycle network management system and processed to provide a life cycle management result.

In a possible embodiment of the management system according to the first aspect of the present invention, the transponder attached to the network device has a memory configured to store updated life cycle data relevant for sustainability, operation, maintenance, surveillance, tracking and/or for recycling of hardware components and/or software components of the respective network device.

In a possible embodiment of the management system according to the first aspect of the present invention, the life cycle data of the network device stored in the memory of the attached transponder is updated directly and/or indirectly by the network device itself periodically and/or event driven.

In a further possible embodiment of the management system according to the first aspect of the present invention, the attached transponder comprises a passive transponder receiving energy from the interrogation unit of the life cycle network management system for reading the updated life cycle data stored in the memory of the attached transponder.

In a still further possible embodiment of the management system according to the first aspect of the present invention, the attached transponder comprises an active transponder powered by a local power source and/or by the network device.

In a still further possible embodiment of the management system according to the first aspect of the present invention, the memory of the transponder attached to the network device is configured to store updated communication setup data read by the interrogation unit of the management system and processed by a processing unit to reestablish the unavailable communication link between the network device and the central network management unit.

In a further possible embodiment of the management system according to the first aspect of the present invention, the interrogation unit is integrated in a handheld scanner device or integrated in a handheld smartphone device.

In a further possible embodiment of the management system according to the first aspect of the present invention, the network management unit has access to a central database of the management system adapted to store life cycle data and/or maintenance data of a plurality of distributed network devices.

In a still further possible embodiment of the management system according to the first aspect of the present invention, the interrogation unit comprises a transceiver adapted to forward automatically the updated life cycle data read from the memory of the transponder attached to the network device to the central network management unit to update the central database of the management system in a state of the network device where the communication link between the network device and the central network management unit is unavailable.

In a still further possible embodiment of the management system according to the first aspect of the present invention, an event driven automatic update of the life cycle data of the network device stored in the memory of the attached transponder is triggered by an event comprising at least one of the following:

an interruption of the communication link between the network device and
   the central network management unit,
   a location change of the network device,
   an operation mode change of the network device,
   a change of the environment of the network device sensed by a sensor,
   a power supply interruption of the network device,
   an update request received from the central network management unit, and/or
   a component change of a component of the network device.

In a still further possible embodiment of the management system according to the first aspect of the present invention, the transponder attached to the network device comprises a memory adapted to store a set of historical life cycle data updates performed by the network device including a timestamp indicating a time when the respective update has been performed and/or the detected event having triggered the respective update.

The invention provides according to the second aspect a network device comprising a communication link interface provided for communication between the network device and a central network management unit of a life cycle network management system of said network via a communication link and a transponder having a data memory configured to store life cycle data and/or maintenance data of the network device updated by the network device and readable by an interrogation unit of the life cycle network management system of said network.

In a possible embodiment of the network device according to the second aspect of the present invention, an update of the life cycle data of the network device is triggered and/or monitored by a central network management unit of the life cycle network management system via the communication link between the network device and the central network management unit.

In a possible embodiment of the network device according to the second aspect of the present invention, the data memory of the transponder attached to the network device further stores updated communication setup data usable for reestablishing an unavailable or interrupted communication link with the central network management unit.

The invention provides according to the third aspect an interrogation unit of a life cycle network management system used for performing life cycle management of distributed network devices of a network, said interrogation unit comprising:

a reader adapted to read life cycle data and/or communication setup data from a data memory of a transponder attached to a network device of the network and a transceiver adapted to forward the read life cycle data and/or communication setup data to a central network management unit of the network management system.

The invention provides according to the fourth aspect a network management unit of a life cycle network management system used for performing life cycle management of distributed network devices of a network, said network management unit comprising:

a communication link interface used for communication with at least one network device of said network via a communication link and a transceiver adapted to receive life cycle data and/or communication setup data of the network device from an interrogation unit of the network management system if the communication link between the network management unit and the network device becomes at least temporarily unavailable.

In a possible embodiment of the network management unit according to the fourth aspect of the present invention, the communication link interface of the network management unit is adapted to reestablish the unavailable communication link with the network device based on the communication setup data received by the transceiver of the network management unit from the interrogation unit.

The invention provides according to the fifth aspect a method for performing life cycle management of distributed network devices of a network by a life cycle network management system of the network, the method comprising the steps of:

monitoring a communication link between a network device of the network and a central network management unit of the life cycle network management system, reading by an interrogation unit of the life cycle management system life cycle data of the network device and/or communication setup data from a data memory of a transponder attached to the network device if the communication link between the network device and the central network management unit of the life cycle network management system becomes at least temporarily unavailable and forwarding the read life cycle data and/or communication setup data by the interrogation unit to the central network management unit of the life cycle network management system for evaluation of the received life cycle data and/or for reestablishing the communication link between the network device and the network management unit on the basis of the forwarded communication setup data.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
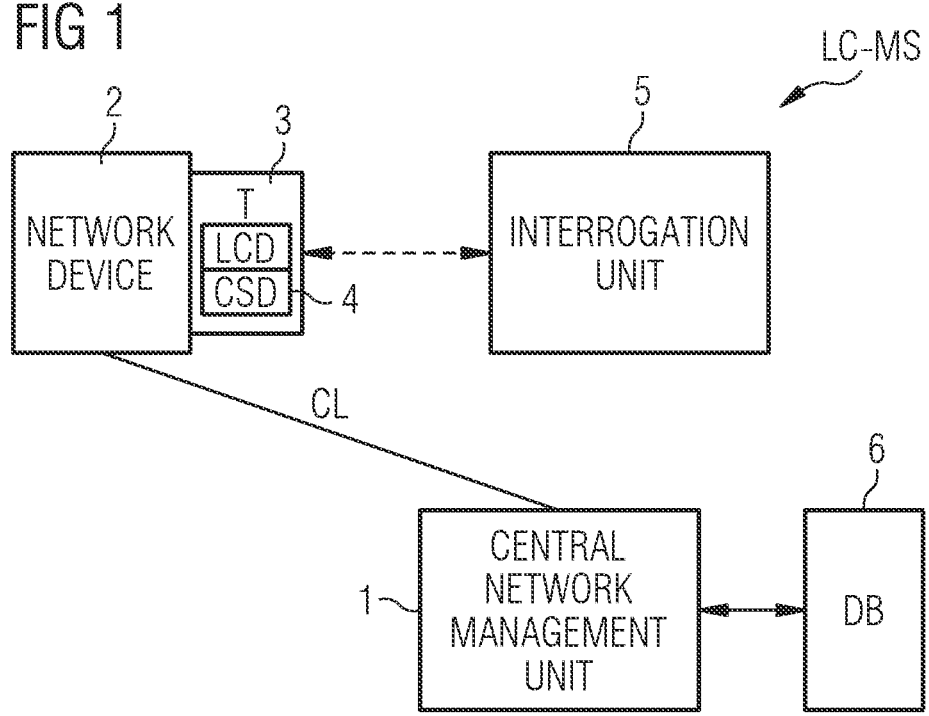
FIG. 1 shows a block diagram for illustrating a possible exemplary embodiment of a management system for performing life cycle management of distributed network devices according to the first aspect of the present invention.

As can be seen in FIG. 1, a management system 1 according to the first aspect of the present invention comprises in the illustrated embodiment a central network management unit 1 which can comprise communication links CL to network devices of a distributed network. As shown in FIG. 1, a network device 2 of the network comprises at least one transponder 3 having an integrated data memory 4 configured to store life cycle data LCD of the network device 2. The transponder 3 can be attached to the network device 2. The network device 2 can comprise a communication link interface to establish a communication link CL with the central network management unit 1 of the management system. If the communication link CL between the network device 2 and the central network management unit 1 of the management system is at least temporarily unavailable the updated life cycle data LCD stored in the memory 4 of the transponder 3 can be read by an interrogation unit 5 of the management system. The life cycle data LCD is read by the interrogation unit 5 of the management system in case that the communication link CL between the network device 2 and the network management unit 1 becomes at least temporarily unavailable and can be further processed to provide a life cycle management result. In a possible embodiment, the read life cycle data LCD is forwarded by the interrogation unit 5 to the central network management unit 1 for further processing. The transponder 3 attached to the network device 2 has a memory 4 configured to store different kinds of life cycle data LCD relevant for the sustainability, operation, maintenance, surveillance of components of the respective network device 2. These components comprise both hardware components and/or software components of the network device 2. The life cycle data LCD stored in the data memory 4 of the transponder 3 are updated by the network device 2 itself. The update of the data stored in the memory 4 can be performed periodically or event driven. The life cycle data LCD of the network device 2 stored in the data memory 4 of the attached transponder 3 is updated in a possible embodiment by a control unit of the network device 2 periodically in response to a detected event. The event can be an internal event such as a changing operation mode of the network device 2 or an external event sensed by sensors connected to the network device 2. As long as the communication link CL is established the network device 2 can also receive an update command to perform the update of the life cycle data LCD.

The attached transponder 3 of the network device 2 can comprise in a possible embodiment a passive transponder receiving energy from the interrogation unit 5 of the management system for reading the updated life cycle data LCD stored in the memory 4 of the attached transponder 3.

In an alternative implementation, the attached transponder 3 comprises an active transponder. The active transponder can in a possible embodiment be powered by a local power source. In a further possible implementation, the active transponder 3 can be powered by the network device 2.

In a further possible embodiment of the management system according to the first aspect of the present invention, the memory 4 of the transponder 3 attached to the network device 2 is configured to store updated communication setup data CSD. The updated communication setup data CSD can be used for reestablishing the communication link CL between the network device 2 and the central network management unit 1 in case that the communication link CL becomes at least temporarily unavailable and/or is interrupted. The updated communication setup data CSD can be read by the interrogation unit 5 of the management system and can then be processed by a processing unit to reestablish the unavailable communication link CL between the network device 2 and the central network management unit 1. In a possible embodiment, the read communication setup data CSD is forwarded by the interrogation unit 5 to the central network management unit 1 which performs a reestablishment of the interrupted or unavailable communication link CL with the network device 2 on the basis of the received updated communication setup data CSD associated with the respective network device 2.

In a possible embodiment, the interrogation unit 5 can be integrated in a handheld scanner device of a user. In a further possible embodiment, the interrogation unit 5 can also be integrated in a handheld mobile smartphone device of a user.

In a possible embodiment of the management system according to the first aspect of the present invention, the network management unit 1 has access to a central database 6 of the management system adapted to store life cycle data LCD of a plurality of distributed network devices 2.

In a possible embodiment of the management system according to the first aspect of the present invention, the interrogation unit 5 can be formed by a handheld scanner device or a handheld smartphone device and comprises a transceiver adapted to forward automatically the updated life cycle data LCD read from the memory 4 of the transponder 3 attached to the network device 2 to the central network management unit 1 to update the central database 6 of the management system in a state of the network device 2 where the communication link CL between the network device 2 and the central network management unit 1 becomes unavailable or is interrupted.

The life cycle data LCD of the network device 2 stored in the memory 4 of the attached transponder 3 is automatically updated in response to a detected event. The event driven automatic update can be triggered by different kinds of events. These events can comprise an interruption of the communication link CL between the network device 2 and the central network management unit 1.

In a further possible embodiment, the update of the life cycle data LCD stored in the memory 4 of the transponder 3 can be performed in response to a location change of the network device 2. In a possible embodiment, the network device 2 comprises means to detect its current location. If the network device 2 detects that its current location has significantly changed, this detected event can trigger an automatic update of its life cycle data LCD stored in the memory 4 of the attached transponder 3.

A further possible event which can trigger an automatic update of the life cycle data LCD by the network device is a change of the environment of the network device 2 sensed by a sensor notifying the change to the network device 2.

A further possible event which can trigger an automatic update of the life cycle data LCD of the network device 2 is a power supply interruption of the network device 2. When a power supply interruption of the network device 2 occurs, the current life cycle data can be saved to the memory 4 of the transponder 3. The memory 4 of the transponder 3 can comprise a non-volatile data memory.

In a further possible embodiment, the event driven automatic update of the life cycle data LCD of the network device 2 is performed in response to an update request received by the network device 2 from the central network management unit 1. Accordingly, the central network management unit 1 of the management system can trigger an automatic update of the life cycle data LCD of a network device 2 as long as the communication link CL between the central network management unit 1 and the respective network device 2 exists.

In a further possible embodiment, the event driven automatic update of the life cycle data of the network device 2 takes place if a component of the network device 2 is changed or replaced. The component can comprise a software component and/or a hardware component of the network device 2.

Further, the update of the life cycle data LCD can be event driven but also performed periodically.

Also, the update of the communication setup data CSD stored in the memory 4 of the transponder 4 can be performed under the control of the network device 2 periodically and/or event driven. Accordingly, the memory 4 of the transponder 3 stores the current updated life cycle data LCD and/or current communication setup data CSD of the respective network device 2. In a further possible embodiment, the transponder 3 attached to the network device 2 comprises a memory adapted to store a set of historical life cycle data LCD updates performed by the network device 2. The life cycle data LCD updates can include a timestamp indicating a time when the respective update has been performed and/or the detected event having triggered the respective update.

Figure 2:
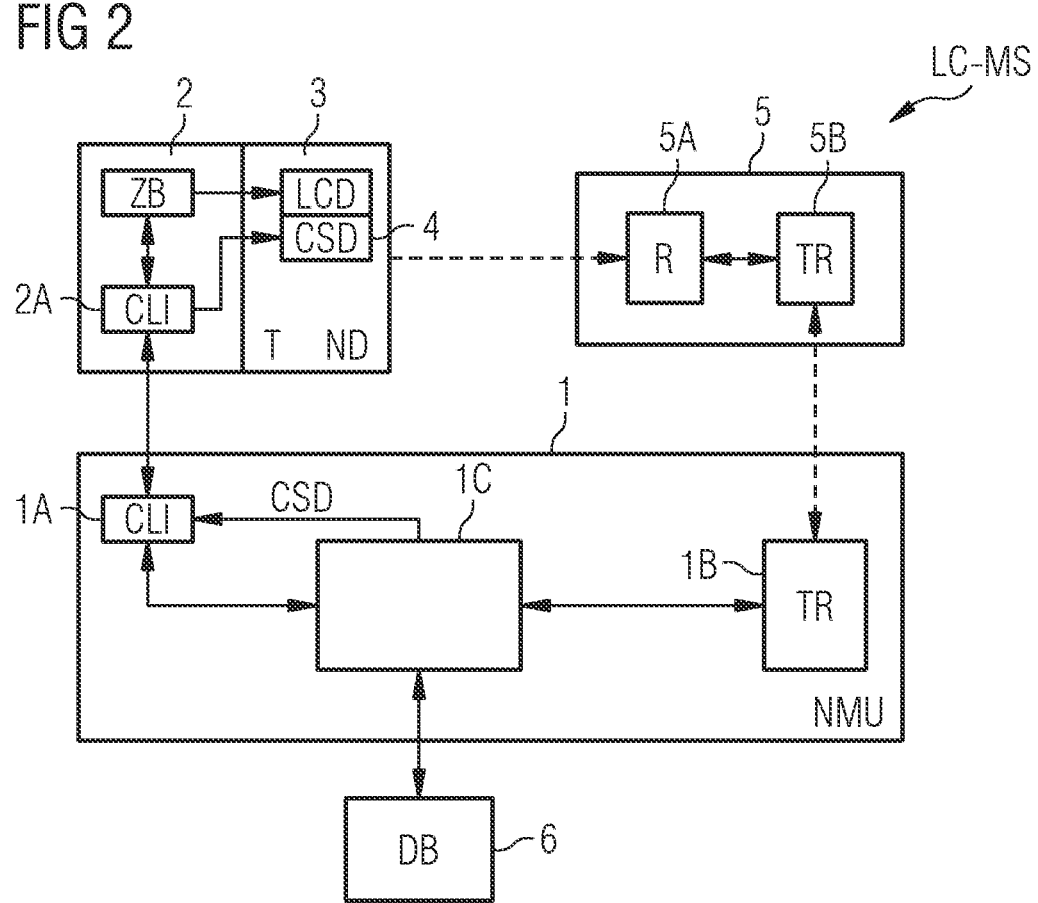
FIG. 2 shows a further block diagram for illustrating a possible exemplary embodiment of a management system for performing life cycle management of distributed network devices according to the first aspect of the present invention.

FIG. 2 illustrates a possible exemplary embodiment of a life cycle(LC)network management system LC-NMS for performing life cycle management of distributed network devices 2 of a network according to the first aspect of the present invention. As can be seen in FIG. 2, the central network management unit 1 comprises in the illustrated exemplary embodiment a communication link interface 1A which is used for communication with at least one network device 2 of the network via a communication link CL as illustrated in FIG. 2. The network management unit 1 further comprises in the illustrated embodiment a transceiver 1B adapted to receive life cycle data LCD and/or communication setup data CSD of the network device 2 from an interrogation unit 5 of the network management system. In a possible embodiment, the transceiver 1B receives the life cycle data LCD and/or communication setup data CSD from the interrogation unit 5 if the communication link CL between the network management unit 1 and the network device 2 becomes at least temporarily unavailable. In the illustrated embodiment of FIG. 2, the network management unit 1 comprises a processor 1C which can be adapted to evaluate the received life cycle data LCD of the network device 2. In a possible embodiment, the processor 1C of the central network management unit 1 is adapted to control the communication link interface 1A on the basis of the received communication setup data CSD of the network device 2 in order to reestablish the unavailable or interrupted communication link CL with the respective network device 2.

The communication link CL between the network device 2 and the network management unit 1 can be a wireless communication link CL or a wired communication link, for instance via a data network.

In the illustrated embodiment of FIG. 2, the network device 2 comprises a corresponding communication link interface 2A provided for communication between the network device 2 and the central network management unit 1 via the communication link CL. Attached to the network device 2 is a transponder 3 comprising a data memory 4 adapted to store life cycle data LCD of the network device 2 and/or communication setup data CSD of the communication link interface 2A of the network device 2 as illustrated in FIG. 2. The network device 2 comprises in the illustrated embodiment a control unit 2B which can also control the update of the life cycle data LCD of the network device 2. The data memory 4 of the transponder 3 is readable by the interrogation unit 5 of the management system. An update of the life cycle data LCD and/or an update of the communication setup data CSD of the network device 2 can be triggered by internal or external events or can be performed periodically by the network device 2. In a possible embodiment, the update of the life cycle data LCD of the network device 2 is triggered and/or monitored by the central network management unit 1 of the network management system via the communication link CL between the network device 2 and the central network management unit 1 as long as the communication link CL between the network device 2 and the central network management unit 1 is available.

The data memory 4 of the transponder 3 attached to the network device 2 stores current updated communication setup data CSD of the communication link interface 2A which can be used for reestablishing an unavailable or interrupted communication link CL between the network device 2 and the network management unit 1. The reestablishment of the interrupted or unavailable communication link CL can be performed under control of the processing unit 1C of the network management unit 1 on the basis of the communication setup data CSD read by the interrogation unit 5 and forwarded by the interrogation unit 5 to the transceiver 1B of the network management unit 1. In the illustrated embodiment of the life cycle network management system LC-NMS as shown in FIG. 2, the interrogation unit 5 comprises a reader 5A and a transceiver 5B. The reader 5A of the interrogation unit 5 is adapted to read the life cycle data LCD and/or communication setup data CSD from the data memory 4 of the transponder 3 attached to the network device 2. The transceiver 5B of the interrogation unit 5 is adapted to forward the read life cycle data LCD and/or read communication setup data CSD to the transceiver 1B of the central network management unit 1 of the life cycle network management system LC-NMS.

The network management unit 1 and the interrogation unit 5 can communicate in a possible embodiment bidirectionally with each other. In case that a communication link CL to a network device 2 gets lost the user of the handheld interrogation unit 5 can be directed by the network management unit 1 of life cycle the network management system LC-NMS to the location of the network device 2. In a possible embodiment, the current position or location of the network device 2 can be stored in the central database 6 of the system. In a possible embodiment, coordinates of the network devices 2 can be read from the database 6 by the processing unit 1C and communicated to the interrogation unit 5 via the bidirectional communication link CL between the transceiver 1B of the network management unit 1 and the transceiver 5B of the interrogation unit 5. In this embodiment, the handheld mobile interrogation unit 5 is navigated under control of the network management unit 1 to the location of the network device 2 whose communication link CL has been interrupted or has become at least temporarily unavailable. When the handheld interrogation unit 5 comes in the vicinity of the transponder 3, the life cycle data LCD and/or the communication setup data CSD of the network device 2 can be read by the reader 5A of the interrogation unit 5 and forwarded by the transceiver 5B of the interrogation unit 5 to the transceiver 1B of the network management unit 1 for further processing. Accordingly, as soon as communication of the network device 2 of the network gets lost, the mobile interrogation unit 5 can be moved to the network device 2 for receiving the current life cycle data LCD of the lost network device 2 and/or for getting communication setup data CSD for reestablishing the lost communication link, CL. In a possible implementation, the interrogation unit 5 comprises an integrated navigation unit adapted to navigate the handheld interrogation unit 5 to a location specified by the network management unit 1.

Figure 3:
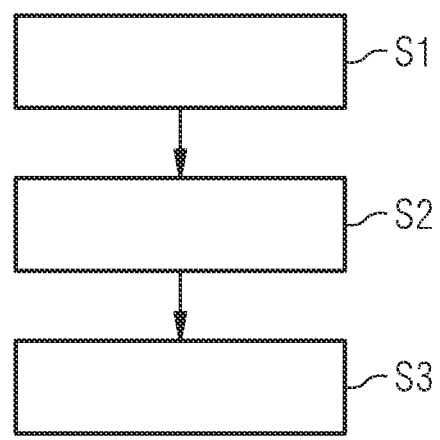
FIG. 3 shows a flowchart for illustrating a possible exemplary embodiment of a method for performing life cycle management of distributed network devices of a network according to a further aspect of the present invention.

FIG. 3 shows a flowchart of a possible exemplary embodiment of a method for performing life cycle management of distributed network devices 2 of a network according to a further aspect of the present invention.

In a first step S1, a communication link CL between a network device 2 of the network and a central network management unit 1 of the management system is monitored.

In a further step S2, life cycle data LCD of the network device 2 and/or communication setup data CSD is read from a data memory 4 of a transponder 3 attached to the network device 2 by an interrogation unit 5 of the life cycle management system if the monitored communication link CL between the network device 2 and the central network management unit 1 of the life cycle management system becomes at least temporarily unavailable.

In a further step S3, the read life cycle data LCD and/or read communication setup data CSD is forwarded by the interrogation unit 5 of the management system to the central network management unit 1 for evaluation of the received life cycle data LCD to provide a life cycle management result and/or for reestablishing the communication link CL between the network device 2 and the network management unit 1 on the basis of the forwarded communication setup data CSD.

Figure 4:
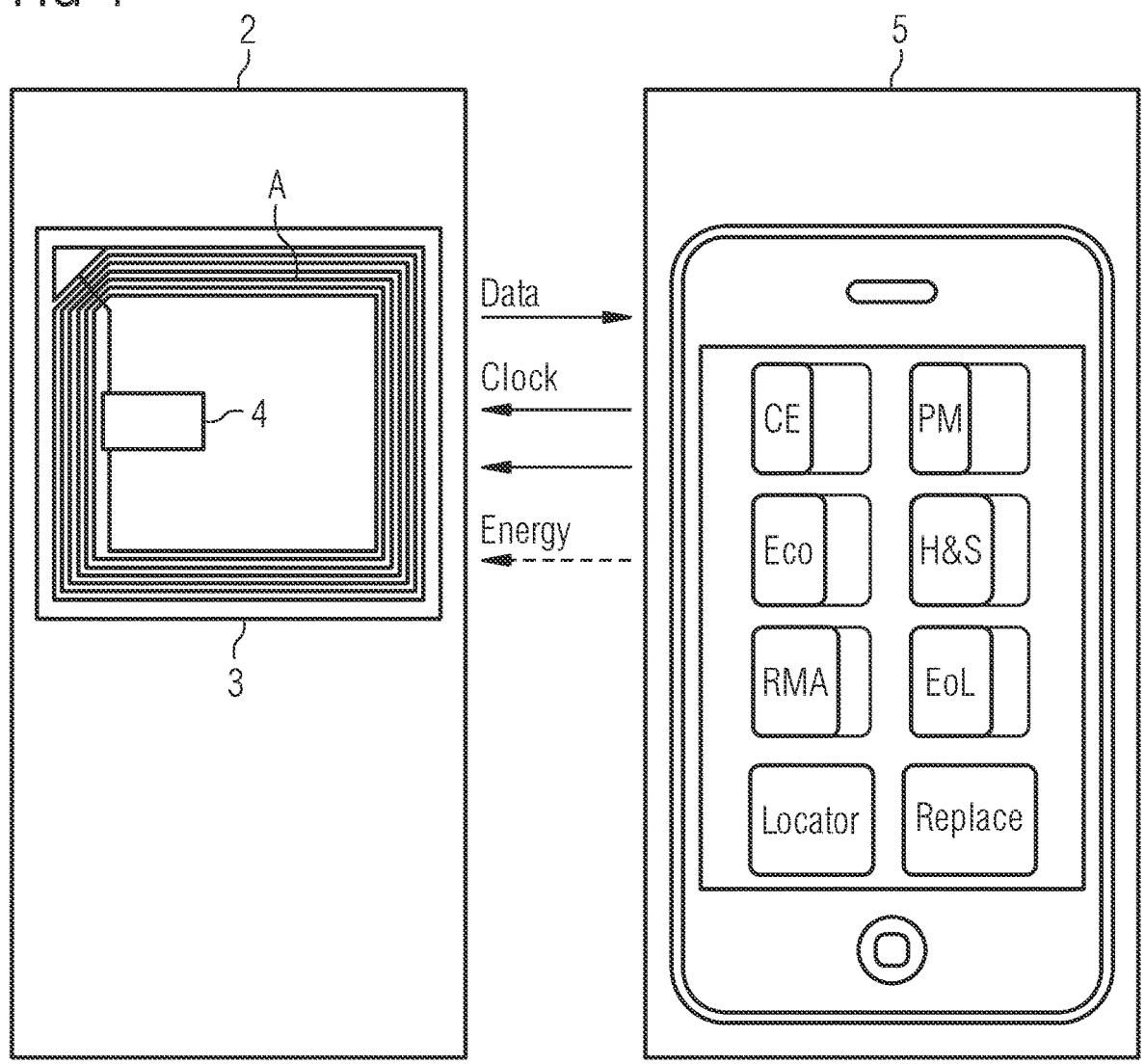
FIG. 4 shows a block diagram for illustrating a possible exemplary embodiment of an interrogation unit as used in a management system according to the present invention.

FIG. 4 illustrates a possible exemplary embodiment of the management system according to the present invention. In the illustrated exemplary embodiment, the interrogation unit 5 is implemented in a handheld smartphone device of a user. On the interrogation unit 5, different application programs can be executed. As can be seen in FIG. 4, the network device 2 comprises an attached transponder 3 having a memory chip 4 and an antenna A. The interrogation unit 5 comprises a reader 5A as shown in FIG. 2 which can read data from the memory chip 4. The data memory 4 can comprise life cycle data LCD and/or communication setup data CSD of the network device 2. The reader 5A of the interrogation unit 5 can supply in a possible embodiment a clock signal to the transponder 3 as illustrated in FIG. 4. In a possible embodiment, the transponder 3 can be formed by an RFID tag. The RFID tag can be either active or passive. In a preferred embodiment, the attached transponder 3 is a passive transponder receiving energy from the interrogation unit 5 of the management system for reading the updated life cycle data LCD and/or the updated communication setup data CSD from the memory chip 4. The life cycle data LCD form a digital footprint of the network device 2. In a preferred embodiment, the transponder 3 is attached to the respective network device 2.

As illustrated in FIG. 4, different application programs can be activated via a graphical user interface of the interrogation unit 5. For instance, the graphical user interface of the interrogation unit 5 can represent displayed buttons to be pressed for activating different application programs. By pressing CE, a user can get relevant circular economy (CE) data for components and submodules of the network device 2. Further, the user may get CE options for life extension or LCA optimized life extension.

By activating the PM application program, a user can receive a status or an auto-signalling of preventive maintenance (PM) requirements and cycles for performing a scheduling.

By pressing EOL (End of Life), using for instance a unique engineer ID, a scrap request might be authorized for disposal of the network device 2 or a recycling process can be initiated.

By pressing H&S, a user can receive a status or auto-signalling of electrical safety and other health and safety (H&S) relevant settings.

By pressing RMA, a user can check an item status or previous repairs. He can raise RMA (Return Material Authorization) for failed units and an auto-replenishment signal can be sent to a supplier.

By pressing ECO, a user can receive all relevant eco-design data of the network device 2 including energy consumption, ambient temperature requirements, hazardous materials, $CO_2$ data and/or energy saving settings.

By activating a locator function, a device search can be initiated. Based on a serial number of the network device 2 and/or location data, a user of the interrogation unit 5 can be navigated to the respective network device 2.

By activating a replace function, the user of the interrogation unit 5 can send a reorder request for replacement to an internal department or directly to a supplier of the respective network device 2 or network device component and can check whether the respective network device 2 or component is available in a stock of the supplier.

Figure 5:
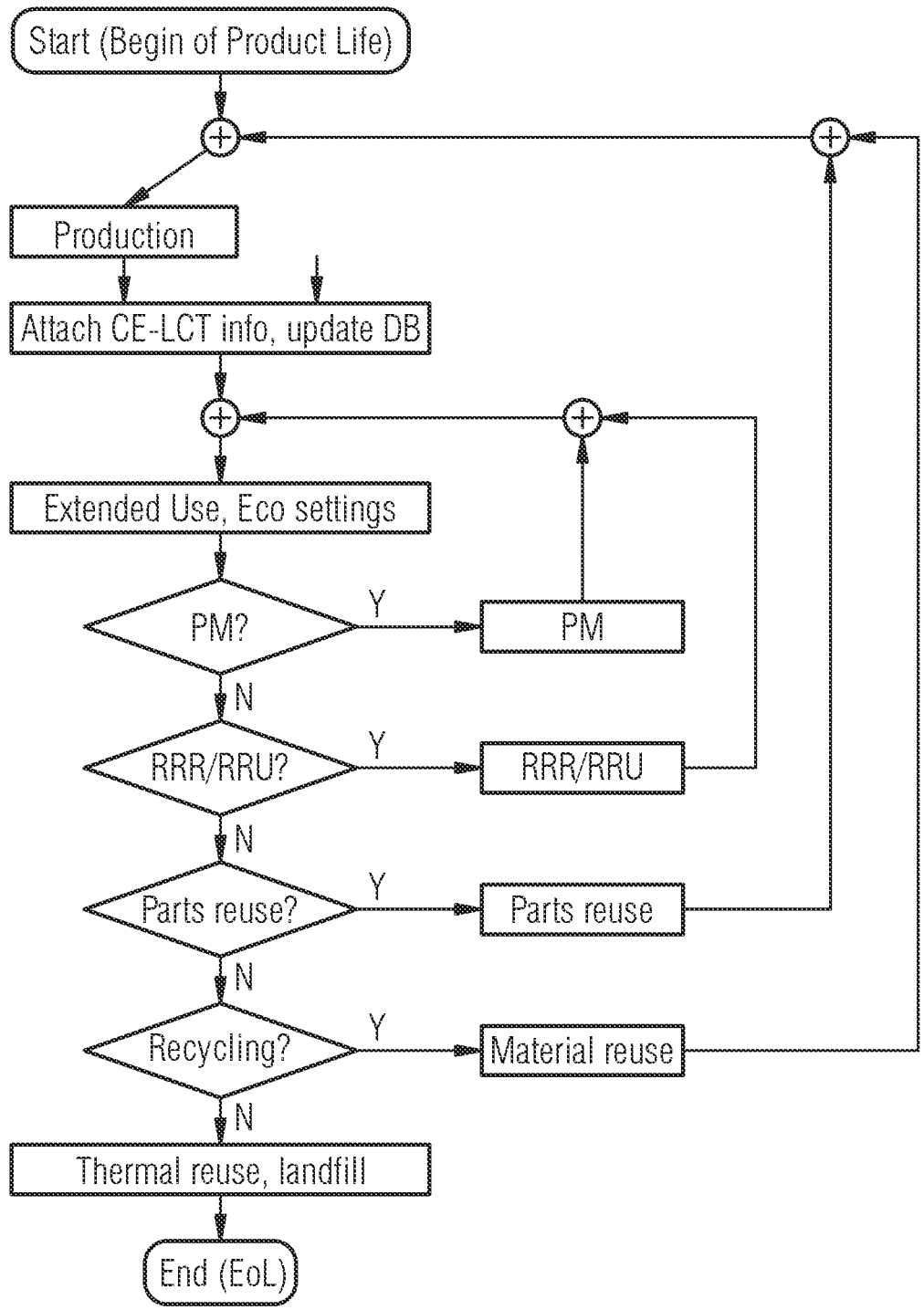
FIG. 5 shows a flowchart for illustrating a circular economy life cycle tracking procedure which can be performed by a management system according to the present invention.

FIG. 5 illustrates a circular economy life cycle tracking (CE-LCT) performed in circular economy loops supported by the management system according to the present invention.

After production and/or deployment of the network device 2, circular economy, CE, life cycle data LCD can be memorized in a transponder 3 attached to the network device 2. A central database such as the database 6 of the system can be updated accordingly. Eco-design data can be provided for extended use. On the basis of the life cycle data LCD, preventive maintenance PM can be controlled and initiated by the life cycle network management system LC-NMS. Further, information about repair, reuse, recycle (RRR) options can be provided and used by the life cycle network management system LC-NMS to initiate the corresponding measures. Further, information about parts reusability can be provided to organize parts reuse in a production chain of a facility. Further, information about recycling capabilities can be provided and used for material reuse in the production chain.

The invention and system according to the present invention allows an end-to-end tracking for a plurality of different and distributed network devices 2 even when communication links CLs between a central network management unit 1 of the management system become at least temporarily unavailable or get completely lost. The management system according to the present invention supports preventive maintenance and repair and supports improved logistics. It allows on-site identification of eco-settings such as energy saving and electrical safety information.

The memory 4 of the attached transponder 3 can contain all relevant data for all aspects of sustainability and operations that are supported, for instance data concerning GHG (Greenhouse Gas) and/or health and safety (H&S). In a possible embodiment, life cycle data LCD also comprise data concerning logistics, i.e. stocking and/or transporting of network devices 2. This can also include guidelines and/or possibilities for parts reuse and/or refurbishment. Further, the life cycle data LCD can include LCA data such as $CO_2$ life cycle footprint data and/or data concerning materials of the network device 2 including hazardous materials such as ozone depleting substances. Life cycle data LCD can also contain any information about maintenance cycles, hardware and/or software releases, age of components, and/or value of components. Depending on preferred sustainability and operations functionality, the data stored in the transponder 3 can be complemented. In addition, the data can be updated and/or replaced, e.g. after repair of a component of the network device 2. The data provided by the transponders and alternatively by cloud-based databases can be used in any case of product failure necessary maintenance or in another scheduled way. In a possible embodiment, the transponder 3 comprises a passive RFID tag. These passive RFID tags provide better availability and security when compared to cloud-based footprints. A passive RFID tag can work even when the network device 2 is deactivated. With RFID tags, it is possible to reuse field engineers' smartphones. RFID tag sensors are relatively cheap and have a low environmental footprint. In any case, they provide a smaller environmental footprint when compared to server or cloud-based approaches.

In an alternative embodiment, also active RFID tags can be used. However, they require a power source which may be provided by the network device 2 or a separate power source of the transponder. The information transponder can also be implemented by barcodes readable by an interrogation unit 5. In a still further possible embodiment, the interrogation unit 5 can also be adapted to write data into the transponder 3 attached to the network device 2, if necessary. The network device 2 can comprise any kind of network devices of networks such as an Ethernet network or an optical network. The network device 2 can for instance be a fiber service platform FSP. The network device 2 can be a complex device comprising subcomponents such as modules or printed circuit boards PCBs. In a possible embodiment, each subcomponent or subsystem of the network device 2 can comprise its individual transponder 3 storing life cycle data LCD of the respective subcomponent.

In a possible embodiment, the transponder 3 can be attached to an already existing network device 2 deployed in the field. In a possible embodiment, there is a data interface between the network device 2 and the transponder 3 which allows to write updated life cycle data LCD into the memory 4 of the transponder 3 as illustrated in FIG. 2. The transfer of the updated life cycle data LCD from the network device 2 to the memory 4 of the transponder 3 can be performed via a wired data interface and/or via a wireless interface between the network device 2 and the transponder 3. In a possible embodiment, a port of the network device 2 can be used for connecting the transponder 3 to the network device 2.

If the network device 2 does not offer any kind of wireless or wired interfaces the life cycle data LCD of the network device 2 can be forwarded via the communication link CL to the network management unit 1 and pushed to the interrogation unit 5. In a possible embodiment, the interrogation unit 5 can comprise a writer which is adapted to write the LCD data of the network device 2 received via the central network management unit 1 into the memory 4 of the transponder 3 attached to the housing of the network device 2.

Accordingly, if a network device 2 having no ports or interfaces for connecting a transponder 3 is deployed in the field, a service engineer carrying the handheld interrogation unit 5 can write life cycle data LCD into the attached transponder 3. On demand, the LCD data written into the memory 4 of the transponder 3 can then be read by the reader 5A of the interrogation unit 5. In a possible embodiment, the service engineer can also update the LCD data stored in the memory 4 of the transponder 3 if a change of relevant life cycle data LCD is notified to the interrogation unit 5 by the central network management unit 1.

In a further possible embodiment, the write unit of the interrogation unit 5 can also be used for initializing communication setup data CSD within the memory 4 of the transponder 3 which can later be used if the communication link CL between the network management unit 1 and the network device 2 gets lost. The interrogation unit 5 can receive the communication setup data CSD from the network management unit 1 wherein the CDS is written by the write unit of the interrogation unit 5 into the memory 4. The central network management unit 1 can read the communication setup data CSD from the communication link 2A of the network device 2 via the still existing communication link CL. When the communication link CL later gets lost the initialized communication setup data CSD written by the interrogation unit 5 into the memory 4 of the transponder 3 can be used for reestablishment of the communication link CL between the network management unit 1 and the network device 2.

Accordingly, the network management unit 1 according to the present invention avoids communication loss with network devices 2 even when the respective communication links CLs fail or are interrupted. For instance, in many scenarios, the network device 2 may be deactivated or plugged from a rack. The network device 2 may lose its power supply and a communication link to the network management unit 1 can be deactivated. The deactivated network device 2 can be stored for recycling. However, since the communication link CL has been lost, the central network management unit 1 of the management system has not access to the life cycle data LCD of the deactivated network device 2. In this scenario, an interrogation unit 5 can be used to retrieve life cycle data LCD of the deactivated and stored network devices 2. On the basis of the retrieved life cycle data LCD, the respective network devices 2 can undergo maintenance and repair or recycling. The life cycle data LCD can be processed to provide different kinds of life cycle management results including time schedules for performing repair, maintenance or a recycling of a deactivated network device 2 and/or of deactivated network device components.

In a further possible embodiment, if an update of the life cycle data LCD becomes necessary, for instance in response to a detected event, and there is no available interface between the transponder 3 and the network device 2, the updated life cycle data LCD can be pushed by the network device 2 via the communication link CL to the network management unit 1 which forwards the updated life cycle data LCD to the interrogation unit 5 and navigates the interrogation unit 5 to the location or position of the respective network device 2 for writing the updated LCD data into the local memory 4 integrated in the transponder 3 attached to the network device 2. Accordingly, the update of the life cycle data LCD of the network device 2 can be performed directly under control of a control unit 2B of the network device 2 via a local data interface between the network device 2 and the connected transponder 3 or indirectly via the central network management unit 1 of life cycle network management system LC-NMS. The embodiment with a direct update has the advantage that an update can even be performed when the communication link CL between the network device 2 and the network management unit 1 fails permanently. The indirect update provides the advantage that the transponder 3 can be attached to the network device 2 without requiring a local data interface between the transponder 3 and the network device 2.

The invention claimed is:

1. A life cycle network management system for performing life cycle and/or maintenance management of distributed network devices of a network, said life cycle network management system comprising:
    a central network management unit for connecting to a network device of the distributed network devices via a communication link, the central network management unit including a processor for processing life cycle data of the network devices;
    a transponder for attaching to the network device and comprising a data memory configured to store life cycle data of the network device updated by said network device; and an interrogation unit comprising a reader for reading the life cycle data from the data memory and a transceiver for forwarding the life cycle data to the central network management unit, wherein, in response to the communication link between the network device and the central network management unit being at least temporarily unavailable;

the interrogation unit reads updated life cycle data of the network device stored in the data memory of the transponder and forwards the updated life cycle data of the network device to the central network management unit; and the processing unit of the central network management unit processes the updated life cycle data of the network device to provide a life cycle and/or maintenance management result.

2. The management system according to claim 1, wherein said memory is configured to store updated life cycle data relevant for sustainability, operation, maintenance, surveillance, tracking and/or for recycling of hardware components and/or software components of the network device.

3. The management system according to claim 1, wherein the life cycle data of the network device stored in the memory of the transponder is updated directly and/or indirectly by said network device itself periodically and/or event driven.

4. The management system according to claim 3, wherein an event driven automatic update of the life cycle data of the network device stored in the memory of the transponder is triggered by an event comprising one of:
  an interruption of the communication link between the network device and the central network management unit,
  a location change of the network device,
  an operation mode change of the network device,
  a change of the environment of the network device sensed by a sensor,
  a power supply interruption of the network device,
  an update request received from the central network management unit, and
  a component change of a component of the network device.

5. The management system according to claim 1, wherein the transponder comprises an active transponder powered by at least one of a local power source and the network device.

6. The management system according to claim 1, wherein the transponder comprises a passive transponder for receiving energy from the interrogation unit for reading the updated life cycle data stored in the memory.

7. The management system according to claim 1, wherein the interrogation unit is integrated in a handheld scanner device or in a handheld smartphone device.

8. The management system according to claim 1, wherein the central network management unit has access to a central database of the life cycle network management system adapted to store life cycle data of a plurality of the distributed network devices.

9. The management system according to claim 1, wherein the interrogation unit comprises a transceiver adapted to forward automatically the updated life cycle data read from the memory of the transponder to the central network management unit to update a central database accessible by the central network management unit, in response to the communication link between the network device and the central network management unit being unavailable.

10. The management system according to claim 1, wherein the transponder comprises a memory adapted to store a set of historical life cycle data updates performed by the network device including a timestamp indicating a time when a respective update has been performed and/or a detected event having triggered the respective update.

11. A network device of a network, said network device comprising:
  a communication link interface provided for communication between the network device and a central network management unit of a life cycle network management system of said network via a communication link; and
  said communication link interface comprising a transponder having a data memory, said data memory configured to store life cycle data of the network device updated by said network device, said updated life cycle data of the network device being readable by an interrogation unit of the life cycle network management system of said network,
  wherein, in response to the communication link between the network device and the central network management unit being at least temporarily unavailable, the updated life cycle data of the network device stored in the data memory of the transponder is read by the interrogation unit of the life cycle network management system, forwarded by the interrogation unit to the central network management unit and processed by a processing unit of the central network management unit to provide a life cycle and/or maintenance management result.

12. The network device according to claim 11, wherein the data memory of the transponder further stores updated communication setup data usable for reestablishing an unavailable or interrupted communication link with the central network management unit.

13. The network device according to claim 11, wherein an update of the life cycle data of the network device is triggered and/or monitored by the central network management unit of the life cycle network management system via the communication link between the network device and the central network management unit.

14. A method for performing life cycle management of distributed network devices of a network by a life cycle network management system of the network, the method comprising the steps of:
  monitoring a communication link between a network device and/or network device module of the network and a central network management unit of the life cycle network management system;
  reading, by an interrogation unit of the life cycle network management system, life cycle data of the network device and/or communication setup data from a data memory of a transponder of said network device and/or network device module;
  forwarding the read life cycle data and/or communication setup data by the interrogation unit to the central network management unit of the life cycle network management system for evaluation of the received life cycle data and/or for reestablishment of the communication link between the network device and/or the net-work device module and the network management unit on the basis of the forwarded communication setup data; and
  in response to the communication link between the network device and the central network management unit being at least temporarily unavailable:

reading, by the interrogation unit of the life cycle network management system, updated life cycle data of the network device stored in the data memory of the transponder;

forwarding, by the interrogation unit, the updated life cycle data of the network device to the central network management unit; and processing, by a processing unit of said central network management unit, the updated life cycle data of said network device to provide a life cycle and/or maintenance management result.

15. An interrogation unit of a life cycle network management system, used for performing life cycle management of distributed network devices of a network, said interrogation unit comprising:

a reader adapted to read life cycle data and/or communication setup data from a data memory of a transponder attached to a network device of the network; and a transceiver adapted to forward the read life cycle data and/or communication setup data to a central network management unit of the life cycle network management system, wherein, in response to a communication link between the network device and the central network management unit of said network being at least temporarily unavailable, the interrogation unit reads updated life cycle data of the network device stored in the data memory of the transponder and forwards the updated life cycle data to the central network management unit and a processing unit of the central network management unit processes the updated life cycle data to provide a life cycle and/or maintenance management result.

16. A central network management unit of a life cycle network management system used for performing life cycle management of distributed network devices of a network, said central network management unit comprising:

a communication link interface used for communication with at least one network device of said network via a communication link;

a transceiver adapted to receive life cycle data and/or communication setup data of the network device from an interrogation unit of the life cycle network management system; and a processor for processing life cycle data of the network device, wherein, in response to the communication link between the network device and the central network management unit being at least temporarily unavailable, the central network management unit receives, from the interrogation unit, updated life cycle data of the network device stored in the data memory of the transceiver read by the interrogation unit, and the processor of the central network management unit processes the updated life cycle data to provide a life cycle and/or maintenance management result.

17. The central network management unit according to claim 16, wherein the communication link interface of the central network management unit is adapted to reestablish the unavailable communication link with the network device based on the communication setup data received by the transceiver of the central network management unit from the interrogation unit.

* * * * *